(No Model.)
D. H. McPHERSON.
STEERING MECHANISM FOR BICYCLES.
No. 475,142. Patented May 17, 1892.
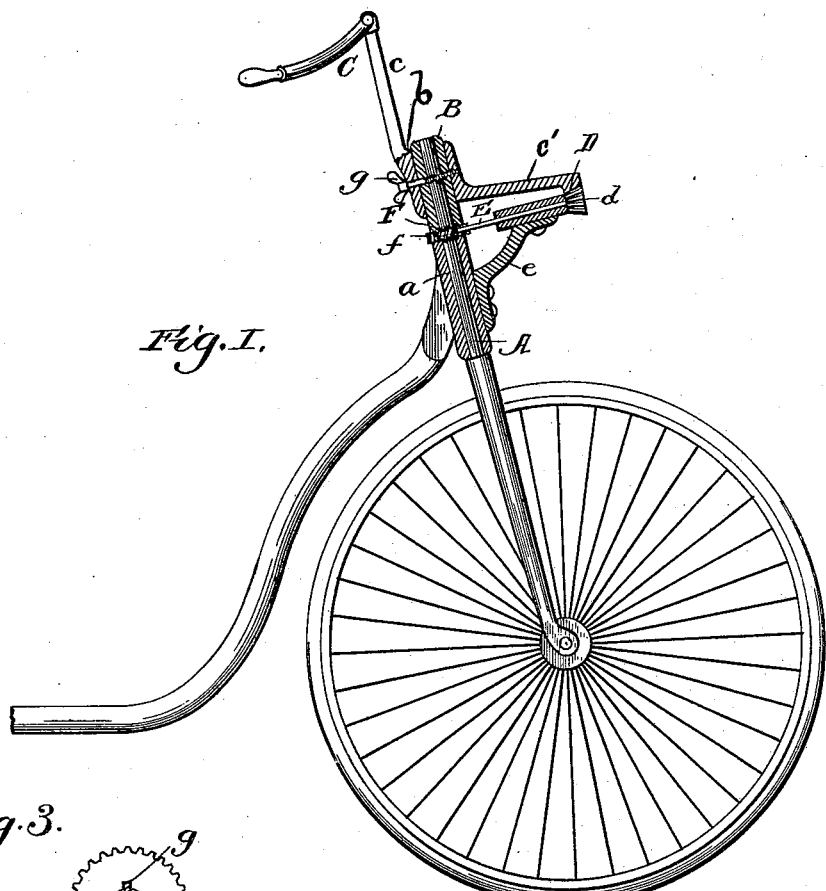
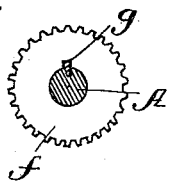
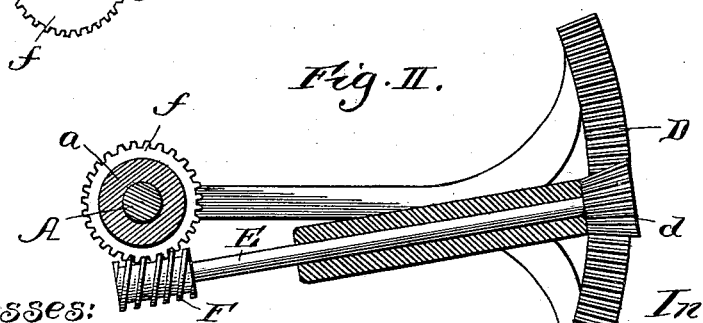
Witnesses:
J. B. McGirr.
William O. Belt.
Inventor:
D. H. McPherson
By his Attorneys,
Edocrib Bros.

UNITED STATES PATENT OFFICE.

DONALD H. McPHERSON, OF LE ROY, NEW YORK.

STEERING MECHANISM FOR BICYCLES.

SPECIFICATION forming part of Letters Patent No. 475,142, dated May 17, 1892.

Application filed November 14, 1891. Serial No. 411,897. (No model.)

*To all whom it may concern:*

Be it known that I, DONALD H. MCPHERSON, a citizen of the United States, residing at Le Roy, in the county of Genesee and State of New York, have invented certain new and useful Improvements in Steering Mechanism for Bicycles and other Vehicles; and I do hereby declare the following to be a full, clear, and exact description of the invention, such as will enable others skilled in the art to which it appertains to make and use the same.

My invention relates to improvements in steering mechanism for bicycles and other vehicles; and the object is to normally hold the handle-bar of the machine in a steady and rigid position, so that it will be unaffected by jars of the wheel when running over stones and like obstructions and at the same time enable the handle-bar to be readily operated to guide the wheel.

In bicycles and similar vehicles adapted to be steered by hand the jar and jolt occasioned by the wheels passing over stones, ruts, &c., become wearisome and injurious to the arms and hands of the rider, who is compelled to keep his hands on the handle-bar. Numerous devices have been devised to obviate these objections, some of which consist of springs forming a part of the steering-fork or provided on the front wheel to decrease the sudden movement of the wheel. Such construction tends to lessen the stability and strength of the wheel. I overcome these objections and provide mechanism which relieves the rider of the jarring movements of the handle-bar and at the same time secure complete control of the steering of the wheel.

With these ends in view I provide a standard on the front wheel of the vehicle, which passes upward loosely through the head and a portion of the handle. The handle is substantially L-shaped in construction and is loosely secured on the standard at or about its angle. The projecting end of this handle is provided with a rack on its lower face, and a bevel-pinion carried by a short shaft meshes with said rack. On the rear end of the shaft is a worm which meshes with a worm-gear rigid on the standard, and as the handle is operated the standard and wheel will be turned by the intermediate devices.

I will now proceed to a detailed description of my invention in connection with the accompanying drawings, and to illustrate the invention to good advantage I have shown the improvements applied to a Safety bicycle.

Figure I is a side view, partly in section, of my improved steering mechanism. Fig. II is a sectional view on the line $x\ x$, looking upward. Fig. III is a detail view of the worm-gear.

Referring to the drawings, in which like letters of reference denote corresponding parts in all the figures, A designates the standard of the bicycle, which extends upward through the head $a$, that is rigid with the frame, as in bicycles of ordinary construction. Loosely fitted on the standard above the head $a$ is a sleeve B, on which the handle C is secured. This handle consists of an upright shank $c$ and the horizontal extension $c'$, and the handle is secured on the sleeve at or about the juncture of the horizontal portion with the upright, as shown at $b$. On the front end of the extension $c'$ is a segmental rack-bar D, the teeth of which are formed on the lower face thereof. A small bevel-pinion $d$, carried by the horizontal shaft E, meshes with the rack-bar D. This shaft E is supported and held in position by a bracket or plate $e$, secured on the head $a$ or integral therewith, and on the rear end of said shaft is a worm F which meshes with a toothed or worm gear $f$, fitted rigidly on the standard A between the head $a$ and the sleeve B.

The operation of the steering mechanism is very simple and may be readily understood from the foregoing description. By this arrangement the wheel may be made to turn in unison with the movement of the handle, or it may be made to turn more or less than the handle by substituting a larger or smaller pinion $d$, which would increase or diminish the speed of the worm, thereby turning the wheel proportionately. This mechanism also holds the wheel in a rigid position, as it cannot be turned except by the handle-bar, so that if the wheel runs over an obstruction it will not affect the steering-handle or jerk the arms of the rider.

I am aware that changes in the form and proportion of parts and details of construction may be made without departing from the spirit or sacrificing the advantages of my invention, and I therefore reserve the right to make such changes as fairly fall within the scope of my invention.

It is obvious that the toothed or worm gear *f* can be rigidly secured on the standard A by a key *g* or equivalent device, and the sleeve B may also be secured to the standard by an adjusting-screw G. In this construction the standard and wheel will be turned and guided directly by the handle, as in the ordinary bicycle.

Having thus fully described my invention, what I claim as new, and desire to secure by Letters Patent, is—

1. The herein-described steering mechanism for vehicles, consisting of the standard, the handle having the horizontal extension on its lower end, which is pivotally secured on the standard, the rack-bar, the worm-gear on the standard, and devices intermediate of the rack-bar and gear to operate the latter, substantially as described.

2. The herein-described steering mechanism for vehicles, consisting of the standard, the angular handle loosely secured thereon and carrying a rack-bar, the worm-gear on said standard, and the horizontal shaft having a pinion on one end to engage with said rack-bar and a worm on the other end to mesh with the worm-gear, substantially as described.

3. In steering mechanism for vehicles, the combination of a standard, the head *a*, the worm-gear rigidly secured thereon, the sleeve loose on said standard above the gear, the angular handle rigid on said sleeve and having a rack-bar on its horizontal portion, a bracket secured on the head, and a horizontal shaft on said bracket and provided with a bevel-pinion which meshes with the rack-bar and with a worm on the other end to engage with the worm-gear, substantially as described.

4. In steering mechanism for vehicles, the combination of a handle having a horizontal integral extension at its lower end, a standard extending upward through said extension at its juncture with the vertical shank of the handle, and connections, substantially as described, intermediate of the horizontal extension and the standard to turn the latter as the handle is operated, substantially as described.

In testimony whereof I affix my signature in presence of two witnesses.

DONALD H. McPHERSON.

Witnesses:
C. L. CARLTON,
F. A. McPHERSON.